3,316,230
METHOD FOR INCREASING THE PARTICLE SIZE OF FINELY DIVIDED DUSTY POLYVINYL ALCOHOL
Walton B. Tanner, Grand Island, N.Y., assignor to E. I. du Pont de Nemours and Company, Wilmington, Del., a corporation of Delaware
No Drawing. Filed Dec. 10, 1963, Ser. No. 329,352
6 Claims. (Cl. 260—91.3)

This invention relates to the production of polyvinyl alcohol. More particularly, it relates to a method of converting polyvinyl alcohol product of undesired fine particle size to granular product of desired particle size, which method involves feeding such product of undesired fine particle size to the vinyl ester alcoholysis system described in my copending application Ser. No. 198,721, filed May 31, 1962.

The production of polyvinyl alcohol by the acid- or alkali-catalyzed alcoholysis of a polyvinyl ester such as polyvinyl acetate in a hydrolytic alcohol such methanol is well known. When only partially alcoholized products are desired, the alcoholysis is generally effected batchwise employing methods involving the use of mixing kneaders or the casting of the alcoholysis mixtures into slabs, although such methods can also be used to produce completely alcoholized products.

A previously preferred method for continuously producing completely alcoholized product is that described in U.S. Patent 2,734,048. It involves continuously feeding a solution of polyvinyl acetate in methanol to an agitated alcoholysis mixture from which a slurry of polyvinyl alcohol in a methanol-methyl acetate solvent mixture is continuously removed. The method avoids the need for heavy mixing equipment by maintaining the concentration of solvent-soluble polyvinyl acetate in the alcoholysis mixture at such a low level, e.g., not over 1%, that only a dilute, and therefore weak and readily comminuted gel structure is formed. However, the completely alcoholized product consists predominantly of particles having diameters in the 5 to 15 micron range, which product tends to be dusty because of its small particle size and relative low particle density. While such small particle size may be advantageous, the dustiness property is distinctly disadvantageous and even creates an explosive hazard.

It is an object of the invention to provide a method for effectively increasing the particle size of polyvinyl alcohols whose particle size is smaller than desired. A further object is to provide such a method for increasing both the particle size and the density of dusty, small particle size polyvinyl alcohols. Still further objects will be apparent from the following description.

When a polyvinyl ester such as polyvinyl acetate is alcoholized in an alcohol such as methanol, the polymer remains soluble until about 45% of the acetate groups have been replaced by hydroxyl groups. Alcoholysis beyond about that point produces material insoluble in the solvent mixture of methanol and by-product methyl acetate then present, which insoluble material takes the form of a gel of polymer molecules associated with methanol of solvation. As solubility decreases by further alcoholysis, this gel becomes tougher and then begins to reject the associated solvent; and when alcoholysis is complete, the polymer and solvent are mutually insoluble.

If the above polymer gel is agitated or kneaded continuously, the product at about 80% alcoholysis will be in the form of discrete particles which, as alcoholysis continues, will retain their form and harden through decreased solvation. If the gel could be agitated uniformly throughout its mass, product of uniform particle size would result. However, such uniform agitation is not readily attainable and most commercial methods for producing polyvinyl alcohols will consequently yield products containing substantial amounts of "fines," i.e., material of undesirably small particle size. These fines can be readily isolated by screening or air classification methods and converted by the method of my invention to essentially dustless product of satisfactory particle size.

The upgrading and conversion of such polyvinyl fines into completely, i.e., at least 98%, alcoholized polyvinyl alcohol of essentially dustless, coarser and denser product granules is accomplished in accordance with my present invention by feeding said fines to the alcoholysis mixture undergoing alcoholysis in the production of polyvinyl alcohol by the method of my copending application Ser. No. 198,721, filed May 31, 1962.

The polyvinyl ester reactant may be fed to the alcoholysis mixture in solid particulate form, or as a solution, e.g., in the alcohol reactant, in the by-product ester, or in a mixture of such alcohol and ester by-product. If the polyvinyl ester and reactant alcohol are fed separately from each other, the feeds of the two will of course be proportioned so as to provide an alcoholysis mixture of suitable composition. Most generally and preferably, the polyvinyl ester will be fed as a solution in the alcohol, which solution may or may not include some of the by-product ester. The following description is directed to this preferred way of feeding.

In the method of my above application, at least part of the alcoholic solution of the polyvinyl ester to be alcoholized is fed to the alcoholysis reaction mixture in intermittent portions of such size that the alcoholysis mixture thickens as each intermittently fed portion passes through the gel phase, with the time interval between succeeding intermittent portions being sufficient for the alcoholysis mixture to revert to a non-thickened condition after each such portion passes through the gel phase and before the next such succeeding portion passes into the gel phase. In that method, the polyvinyl ester molecules fed in a given intermittent portion will disperse throughout the agitated mixture, and all those molecules which are alcoholized in the solvent phase will reach the gel state simultaneously and set up what may be regarded as a "batch" gel. This gel can be regulated in strength by regulating the size of the portion fed intermittently which in turn regulates the particle size to which the gel is broken by the agitation. I have discovered that if polyvinyl alcohol fines are fed to such alcoholysis mixture, they become upgraded in size by incorporation into the coarser granular product being formed in the system, or by agglomeration by the cementing action of the gel.

It will be apparent from the foregoing that the method of this application for upgrading polyvinyl alcohol fines must be practiced and integrated with the method of my prior copending application Ser. No. 198,721, for alcoholizing polyvinyl esters. The entire disclosures of the specification of my said prior application are, therefore, pertinent to the understanding and practice of the method of my present application and are incorporated herein by this reference thereto.

I have found that when polyvinyl alcohol fines are fed to the alcoholysis mixture as indicated above, the agglomerates first formed are quite weak and, on isolating and drying, will generally break down to the original particle size. However, another phenomenon comes into play to inhibit or prevent such break down. As noted in my above prior application, the catlyst, e.g., sodium methylate, in the alcoholysis mixture is preferentially absorbed in the solid phase where its concentration may be many, e.g., 2 to over 100, fold greater than in the liquid phase of the mixture. This distribution of catalyst is caused by the by-product methyl acetate which reduces solubility of sodium methylate causing it in turn to migrate into the solid polyvinyl alcohol phase with its multitude of compatible hydroxyl groups. Granules of polyvinyl alcohol in the alcoholysis mixture are, therefore, sources of high catalyst concentrations. As the granules become coated with a film of polyvinyl acetate from each intermittent feed of the latter, the coating film rapidly alcoholizes as a static film on the granules. Conversely, the polyvinyl acetate in the solvent phase of the mixture is in a low catalyst environment and alcoholizes at a relatively slow rate. Thus, most of the polyvinyl acetate fed alcoholizes as films on the product granules while only a minor proportion actually reaches the gel state in the solvent phase. This phenomenon involving the formation of films of alcoholized product upon granules of such product is herein called "polymer layering." It is increased by increasing the methyl acetate content of the solvent phase which can be effected by increasing the polyvinyl acetate content of the solution fed to the sysem and/or by adding additional methyl acetate to the alcoholysis vessel.

I have found that agglomerates formed of dusty polyvinyl alcohol fines added to the alcoholysis mixture will have become, after 5 to 10 intermittent feedings of polyvinyl acetate solution in accordance with the method of my prior application, sufficiently toughened by polymer layering so that they will no longer break down to the original dusty particles upon isolation and drying. Thus, a single intermittent feed of a portion of polyvinyl acetate sufficient in size to cause a granulation gel setup was added to the alcoholysis mixture containing about 10% of polyvinyl alcohol fines. Upon removing and wet screening a sample of the solid particles present after the gel setup, the fines were found to have disappeared. However, when the sample was dried in a rotating flask containing ceramic balls, the resulting polyvinyl alcohol was as fine and dusty as the starting material. On the other hand, a sample of the solid product taken after 5 such intermittent additions of polyvinyl acetate and 5 ensuing granulation setups, contained only a trace of fines when the sample was similarly dried. A sample taken after 10 such intermittent additions of polyvinyl acetate and granulation setups after similar drying, was completely free of fines.

The number of intermittent feedings of polyvinyl acetate and corresponding granulation setups required to toughen the agglomerates adequately is not a definite fixed number applicable to all circumstances, since it is also dependent upon the extent to which polymer layering occurs following each gel setup. As noted previously, such layering requires relatively high concentration of catalyst in the product granule phase, which in turn requires a relatively high methyl acetate concentration.

This phenomenon of particle size growth by which fines are upgraded particles size-wise in the method of the invention is in no way similar or related to growth by crystallization in crystallization systems. Rather, if the present intermittent feed alcoholysis system is producing 1,000 micron diameter product granules and 1 to 10 micron diameter fines are introduced, the system will continue to produce predominantly 1,000 micron granules into which many particles of fines, depending on the amount introduced, will be incorporated into the first product granules formed thereafter. It has been noted in instances where control of granulation in the process of Ser. No. 198,721 has been lost temporarily with resultant production of fines, that the very first gel setup occurring thereafter in the system caused complete disappearance of the fines. In crystallizations, similar molecules are present in the solid and liquid phases simultaneously. In the present system there is no polyvinyl alcohol in the liquid phase and the solid polyvinyl alcohol phase forms by a chemical reaction in which acetate groups of the polymer chain are replaced by hydroxyl groups and the polymer thereby becomes completely insoluble in the liquid phase.

Polyvinyl alcohol fines of any source may be upgraded as to particle size by the method of invention. Thus, they may be of either partially or completely alcoholized polyvinyl alcohol. If the fines are of partially alcoholized material, they will be converted to completely alcoholized product since my method yields only completely hydrolyzed product. Fines produced by the continuous alcoholysis method of Patent 2,734,048 are somewhat difficult to agglomerate since they are smooth surfaced fine particles to which new gels do not cling readily, and gels formed on the particle surfaces tend to disengage therefrom as the new gel undergoes syneresis. Thus, when such fines were fed as a slurry in alcoholysis solvent to an intermittent feed alcoholysis system in proportions of 1.5 parts to 1 part of polyvinyl acetate, only one-third of the fines were incorporated into the product granules; two-thirds left unchanged with the vessel effluent. However, such fines if completely encased by new gel will usually remain permanently encased. Reducing the amount of fines fed improves encasement and the effectiveness of the agglomeration. Fines from kneader alcoholysis systems and those from the intermittent feed system of my above prior application are irregular in shape and porous and can be very readily agglomerated by the present method.

When the intermittent feed alcoholysis system of my above application is operated, especially at low catalyst level to minimize the ash content of the product or for other reasons, varying amounts of polymer still in the solvent-soluble state short-circuit and leave the alcoholysis vessel with the product that is withdrawn. This may be as high as 5% of the polyvinyl acetate fed. In the second or holding vessel, a portion thereof forms polyvinyl alcohol by "polymer layering" and since the polyvinyl acetate concentration in the second vessel is too low to form granules it also alcoholizes partially as new very fine particles. Since also there is little polyvinyl acetate available there for "polymer layering," these new very fine particles remain as fine, porous, low density dusty product. They can be removed by screening or classification and on recycle to the alcoholysis vessel of the system, are the easiest of all polyvinyl alcohol fines to be agglomerated and encased in new product granules. Treatment of polyvinyl alcohol fines in accordance with my inevntion also reduces formation of oversize granules in the intermittent feed system, particularly when operating the alcoholysis vessel at high solids contents and denser particles are usually obtained.

When the intermittent feed alcoholysis method of my application Ser. No. 198,721 was operated under steady conditions substantially as described in Example 4 of that application, the particle size distribution of the product from the alcoholysis vessel was determined. Product fines previously accumulated from the same system were then recycled (as an 18% suspension in methyl acetate) to the alcoholysis vessel at the rate of 11.5% of the product being produced and when steady state conditions had been reached, the particle size distribution of the product from the alcoholysis vessel was again determined. These particle size data together with similar data for the recycle fines are tabulated below:

| Sample | Screen Size (U.S. Standard Screen Scale) (Figures represent percentages by weight) | | | | | | | | |
|---|---|---|---|---|---|---|---|---|---|
| | 10 | 20 | 40 | 60 | 80 | 100 | 200 | 325 | Pan |
| Steady state before recycling fines | 0 | 2.6 | 32.4 | 38.8 | 9.1 | 4.1 | 9.3 | 0.1 | 3.4 |
| Steady state while recycling fines | 0 | 1.3 | 13.4 | 32.7 | 19.3 | 9.5 | 20.0 | 2.6 | 1.2 |
| Fines recycled | | | | | | 2.4 | 35.7 | 20.5 | 39.9 |

It will be seen from the above data that before recycling the fines, the product consisted mainly of particles in the 20–60 mesh range but included 3.4% of material finer than 325 mesh. Recycling of the fines, which included 39.9% of material finer than 325 mesh, resulted in an upgrading of the recycled material, and reduced significantly the amounts produced during the recycling of material in both the upper and lower particle sizes of the ranges shown.

The alcoholysis system to which the polyvinyl alcohol fines are fed in accordance with the present invention may be operated under the conditions described in detail in my above prior application. It will generally be advisable to restrict the amount of fines fed to the alcoholysis system so as not to exceed 150% of the weight of the polyvinyl ester fed to the alcoholysis vessel. Feeds of fines equal to from 5 to 50% of the weight of the polyvinyl ester are generally preferred, although smaller feeds of fines obviously can be employed successfully. The polyvinyl alcohol fines to be upgraded in particle size will of course be of particle size less than that of the product being produced in the alcoholysis system to which it will be fed. Generally, such fines will consist predominantly of material of a size less than about 100 mesh with sufficient low density material smaller than 325 mesh to make the fines dusty.

The polyvinyl alcohol fines may be fed in dry form directly to the alcoholysis mixture of the intermittent feed alcoholysis system. Alternatively, products of such a system may be liquid classified in the alcoholysis solvent mixture before filtering and the fines returned to the alcoholysis system as concentrated slurry or filter cake; or, they can be slurried in methyl acetate or methanol and returned to the system as a slurry concentrate; or, the fines can be liquid classified from the effluent of the second or finishing vessels and returned as slurry concentrate or filter cake. This recycles absorbed catalyst along with the fines, thus reducing catalyst requirements and final product salt contamination.

In the foregoing description and the following claims, all percentages and parts are by weight unless specified to be otherwise.

The embodiments of the invention in which an exclusive property or privilege is claimed are as follows:

1. The method of increasing the particle size of finely divided dusty polyvinyl alcohol consisting predominately of particles of a size less than about 100 mesh, said method comprising (A) feeding to a catalyzed and agitated alcoholysis mixture (a) said finely divided polyvinyl alcohol, (b) a polyvinyl ester and (c) a hydrolytic alcohol, and (B) withdrawing from said alcoholysis mixture a slurry of polyvinyl alcohol product in a solvent mixture of said hydrolytic alcohol and the ester of said hydrolytic alcohol with the acid residue of said polyvinyl ester, said alcoholysis mixture consisting essentially of said polyvinyl ester, an alcoholysis catalyst, said hydrolytic alcohol, said ester of said hydrolytic alcohol and polyvinyl alcohol, at least a part of said polyvinyl ester being fed to said alcoholysis mixture in intermittent portions of such size that said alcoholysis mixture thickens as each said portion after addition to said alcoholysis mixture passes through a gel phase, each such intermittent portion of said polyvinyl ester feed being of such size and being fed at such a rate that if such rate of feed were maintained continuously said alcoholysis mixture would set up to a non-moving gelled mass, with the time interval between succeeding intermittent portions of said polyvinyl ester feed being sufficient for said alcoholysis mixture to revert to a non-thickened condition after each said portion passes through the gel phase and before the next succeeding portion passes into the gel phase.

2. The method of increasing the particle size of finely divided dusty polyvinyl alcohol consisting predominately of particles of a size less than about 100 mesh, said method comprising (A) feeding to a catalyzed and agitated alcoholysis mixture (a) said finely divided polyvinyl alcohol and (b) a solution of polyvinyl acetate in methanol, and (B) withdrawing from said alcoholysis mixture a slurry of polyvinyl alcohol product in a mixture of methanol and methyl acetate, said alcoholysis mixture consisting essentially of polyvinyl acetate, an alkaline alcoholysis catalyst, methanol, methyl acetate and polyvinyl alcohol, at least a part of said polyvinyl acetate feed solution being fed to said alcoholysis mixture in intermittent portions of such size that said alcoholysis mixture thickens as each portion after addition to said alcoholysis mixture passes through a gel phase, each said intermittent portion of said polyvinyl acetate feed solution being of such size and being fed at such a rate that if such rate of feed were maintained continuously said alcoholysis mixture would set up to a non-moving gelled mass, with the time interval between succeeding intermittent portions of said polyvinyl acetate feed solution being sufficient for said alcoholysis mixture to revert to a non-thickened condition after each said portion passes through the gel phase and before the next succeeding portion passes into the gel phase.

3. The method according to claim 2 wherein the amount of finely divided dusty polyvinyl alcohol fed to the agitated alcoholysis mixture does not exceed 150% of the weight of the polyvinyl acetate fed.

4. The method according to claim 2 wherein the amount of finely divided dusty polyvinyl alcohol fed to the agitated alcoholysis mixture is from 5 to 50% of the weight of the polyvinyl acetate fed.

5. The method according to claim 2 wherein the finely divided dusty polyvinyl alcohol fed to the agitated alcoholysis mixture is material isolated from the polyvinyl alcohol product produced in the process.

6. The method of claim 2 employing a sodium methylate-catalyzed alcoholysis mixture.

References Cited by the Examiner

UNITED STATES PATENTS 2,721,859  10/1955  Fuhrman _____ 260—92.8
2,779,752   1/1957  Vining _____ 260—91.3

JOSEPH L. SCHOFER, *Primary Examiner.*

J. F. McNALLY, *Assistant Examiner.*